United States Patent [19]
Satoh et al.

[11] Patent Number: 5,802,951
[45] Date of Patent: Sep. 8, 1998

[54] BRAKE BOOSTER

[75] Inventors: Tohru Satoh; Makoto Watanabe; Naohito Saito, all of Saitama-ken, Japan

[73] Assignee: Jidosha Kiki Co., Ltd., Tokyo, Japan

[21] Appl. No.: 794,866

[22] Filed: Feb. 5, 1997

[30] Foreign Application Priority Data

Feb. 29, 1996 [JP] Japan .................................. 8-069345

[51] Int. Cl.⁶ .................................................. F15B 9/10
[52] U.S. Cl. ...................................... 91/376 R; 92/169.2
[58] Field of Search ............................. 91/369.1, 369.2, 91/369.3, 376 R; 92/169.2

[56] References Cited

U.S. PATENT DOCUMENTS

| | | | |
|---|---|---|---|
| 3,350,882 | 11/1967 | Leising | 91/369.1 X |
| 4,499,812 | 2/1985 | Pressaco et al. | 91/376 R |
| 4,545,206 | 10/1985 | Kobayashi . | |
| 4,718,328 | 1/1988 | Mori et al. . | |
| 5,063,830 | 11/1991 | Konishi | 92/169.2 |
| 5,170,628 | 12/1992 | Satoh et al. | 91/369.1 X |
| 5,228,377 | 7/1993 | Watanabe . | |
| 5,235,897 | 8/1993 | Watanabe . | |
| 5,247,868 | 9/1993 | Satoh et al. . | |
| 5,337,650 | 8/1994 | Uyama . | |

FOREIGN PATENT DOCUMENTS 4-185571  7/1992  Japan .

OTHER PUBLICATIONS

Formal drawings from U.S. Serial No. 08/704 452 Atty Ref: Kanzaki Case 114 (3 sheets).
Formal drawings from U.S. Serial No. 08/791 135 Atty Ref: Kanzaki Case 121 (2 sheets).

Primary Examiner—Hoang Nguyen
Attorney, Agent, or Firm—Flynn, Thiel, Boutell & Tanis, P.C.

[57] ABSTRACT

A brake booster is disclosed which functions as an automatic brake as required. Bellows is disposed within a constant pressure chamber of the brake booster, and has a front end which is connected, by a first support member, to a bulge which is formed in the axial portion of a shell. A seal member is connected to the outer periphery of the first support member, and is held in abutment against the wall surface of the shell at a location radially outward of an inlet for the atmosphere. A communication channel is formed by a space between the first support member and an opposing wall surface of the shell and the bulge and the like. A communication is established between the internal space of the bellows and the inlet through the communication channel. This construction allows the overall length of the brake booster to be reduced as compared with the prior art in which a spacer is provided outside the shell.

5 Claims, 6 Drawing Sheets

BRAKE BOOSTER

FIELD OF THE INVENTION

The invention relates to a brake booster, and more particularly, to a brake booster which is capable of functioning as an automatic brake when required.

DESCRIPTION OF THE PRIOR ART

A brake booster having the function of an automatic brake is known in the art including a valve body which is disposed in a shell in a movable manner, a power piston mounted on the valve body, a constant and a variable pressure chamber defined across the power piston, bellows disposed within the constant pressure chamber and having its rear end connected to the valve body, and an inlet which allows a negative pressure or an atmosphere to be introduced into an internal space of the bellows (see, for example, Japanese Laid-Open Patent Application No. 185,571/92). A conventional brake booster as described above is arranged to reduce a lossy load when a pressure fluid is introduced into the bellows to actuate the brake booster as an automatic brake, by reducing the diameter of the bellows than in a conventional brake booster.

However, in the conventional brake booster as described, the inlet has been formed by a space between a tubular portion which bulges forward from a shell along its axis and an output shaft which extends therethrough, concomitantly with a reduction in the diameter of the bellows. In addition, a spacer is mounted on the outside of the front end of the shell and is formed with a communication channel therein which allows a communication between the inlet and a conduit which feeds the pressure fluid.

With the conventional brake booster as described, a disadvantage has been recognized that a need to mount the spacer on the front side of the shell concomitant with a reduction in the bellows results in an increased overall length of the brake booster.

SUMMARY OF THE INVENTION

In view of the foregoing, the invention provides a brake booster including a valve body which is slidably disposed within a shell, a power piston mounted on the valve body, a constant and a variable pressure chamber defined across the power piston, bellows disposed within the constant pressure chamber and having its rear end connected to the valve body, a bulge formed in an axial portion of the shell at its front end and extending rearward of the shell, and an inlet formed in the shell at a location radially outward of the bulge to allow a negative pressure or an atmosphere to be introduced into the internal space of the bellows, the bulge on the shell including a tubular portion which extends rearward and an end face which extends radially inward from the rear end of the tubular portion.

In accordance with the invention, an annular, first support member is disposed within the constant pressure chamber, with a seal member interposed between the outer periphery of the first support member and the wall surface of the shell at a location radially outward of the inlet to maintain a hermetic seal, while the inner periphery of the first support member holds a front end of the bellows in an hermetically sealed manner, and a front end of the bellows is held in abutment against the end face of the bulge under such condition, whereby a communication channel which allows a communication between the inlet and the internal space of the bellows is formed by a space formed between the first support member and the opposing wall surface of the shell and the bulge, and a radial clearance formed in the front end of the bellows.

With this construction, the communication channel can be constructed within the shell. Accordingly, a reduction in the diameter of the bellows can be achieved without providing a spacer as in the prior art. Hence, the overall length of the booster can be reduced as compared with the prior art.

Above and other objects, features, and advantages of the invention will become apparent from the following description of several embodiments thereof with reference to the attached drawings.

DETAILED DESCRIPTION OF THE EMBODIMENTS

Figure 1:
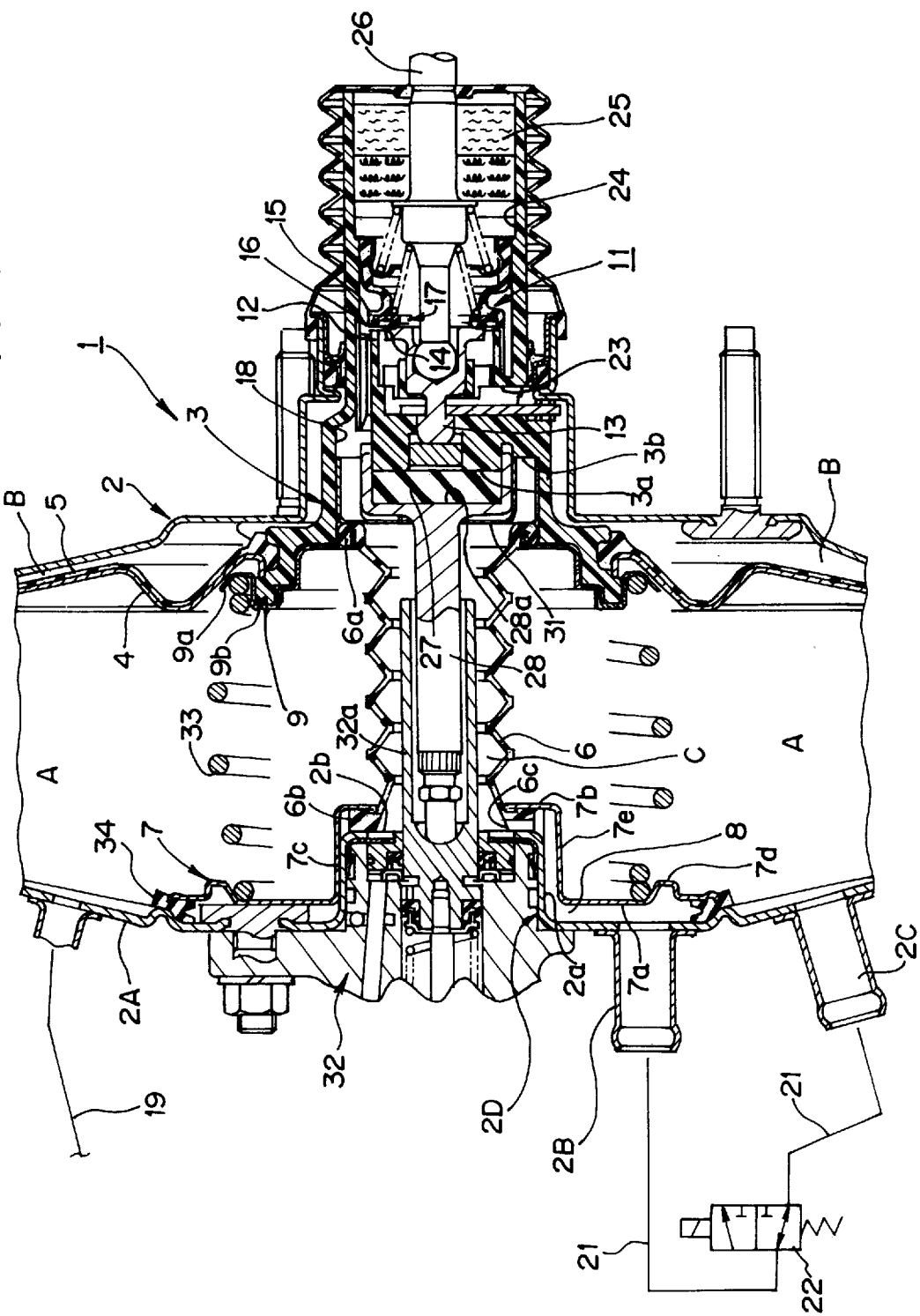
FIG. 1 is a cross section of one embodiment of the invention.

Referring to the drawings, FIG. 1 shows a brake booster 1 including a shell 2 in which a tubular valve body 3 is slidably disposed. A power piston 4 is connected around the outer periphery of the valve body 3 at its forward portion. A diaphragm 5 is applied to the back surface of the power piston, thus defining a constant pressure chamber A and a variable pressure chamber B across the diaphragm 5.

Bellows 6 is disposed within the constant pressure chamber A, and is connected to a wall surface 2A of the shell 2 at its axial portion by an annular, first support member 7 at its front end 6b, while a rear end 6a of the bellows 6 is connected to the inner periphery of the valve body 3 at its front end by an annular, second support member 9. The bellows 6 partitions the interior of the constant pressure chamber A into a bellows chamber C which represents the internal space of the bellows 6 and an outer space. The bellows chamber C communicates with an inlet 2B formed in the shell 2 through a communication channel 8 which will be described later.

A valve mechanism 11, which switches a communication between the constant and the variable pressure chamber A, B in a known manner, is disposed within the valve body 3. The valve mechanism 11 comprises an annular, first valve seat 12 formed on the valve body 3, an annular, second valve seat 14 located radially inward of the first valve seat 12 and formed on a valve plunger 13 which is slidably disposed within the valve body 3, and a valve element 15 which is urged by a spring to be seated upon either a valve seat 12 or 14. An annular seat formed by a combination of the first valve seat 12 and the valve element 15 which engages with or disengages from it defines a vacuum valve 16, while an annular seat formed by a combination of the second valve seat 14 and the valve element 15 which engages with or disengages from it defines an atmosphere valve 17. A space located radially outward of the vacuum valve 16 communicates with the bellows chamber C through a constant pressure passage 18 formed in the valve body 3.

The interior of the constant pressure chamber A which is located outside the bellows chamber C is maintained in communication with a source of negative pressure, not shown, through a conduit 19. Accordingly, a negative pressure is normally introduced into the constant pressure chamber A which is located outside the bellows chamber C.

At a location opposite to the support member 7, the front wall surface 2A of the shell 2 is formed with an inlet 2B, and at a location facing the constant pressure chamber A which is outside the bellows chamber C, the wall surface 2A of the shell 2 is formed with another juncture port 2C. One end of a conduit 21 is connected to the juncture port 2C while the other end of the conduit 21 is connected to the inlet 2B. A solenoid operated switching valve 22, which is operated by a controller, not shown, is disposed in the conduit 21. In the inoperative condition of the valve 22 as shown in FIG. 1, a communication is established between the bellows chamber C and the constant pressure chamber A which is located outside thereof through the conduit 21, and hence a negative pressure is introduced into the entire constant pressure chamber A inclusive of the bellows chamber C.

A space located radially inward of the vacuum valve 16, but located radially outward of the atmosphere valve 17 communicates with the variable pressure chamber B through a radially extending variable pressure passage 23 formed in the valve body 3.

Finally, a space located radially inward of the atmosphere valve 17 communicates with the atmosphere through an atmosphere passage 24 defined by the inner peripheral surface of the valve body 3 at its rear portion and a filter 23 disposed therein.

A right end of a valve plunger 13 is connected to an input shaft 26 which is coupled to a brake pedal, not shown, while the left end of the valve plunger 13 is disposed in opposing relationship with a reaction disk 27 which is received in a recess formed in the rear end of an output shaft 28.

The recess 28 of the output shaft 28 is slidably fitted over an annular projection 3a extending forwardly from the inner periphery of the valve body 3. An annular retainer 31 is fitted over the end of the output shaft 28 in which the recess 28a is formed, from the front side, and is fitted into the inner periphery of the valve body 3. In this manner, a disengagement of the end of the output shaft 28 in which the recess 28a is formed from the annual projection 3a is prevented.

On the other hand, the left end of the output shaft 28 is coupled to a piston 32a of a master cylinder 32 which extends through an opening formed in the wall surface 2A of the shell 2.

A return spring 33 is disposed in the constant pressure chamber A located outside the bellows chamber C, and its resilience causes the valve body 3 to be positioned in its inoperative position shown.

In the present embodiment, the front end 6b and the rear end 6a of the bellows 6 are connected to the shell 2 and the valve body 3, respectively, in a manner to be described below to allow bellows 6 of a reduced diameter to be used.

Specifically, in the present embodiment, the front end wall 2A of the shell 2 is formed, in its axial portion, with a bulge 2D which extends rearwardly or inwardly. The bulge 2D comprises a tubular portion 2a which extends axially rearward, and an end face 2b which extends radially inward from the rear end of the tubular portion 2a. A housing of the master cylinder 32 is fitted, from the front side, into the bulge 2D while the piston 32a of the master cylinder 32 extends through an opening formed in the axial portion of the end face 2b.

Figure 2:
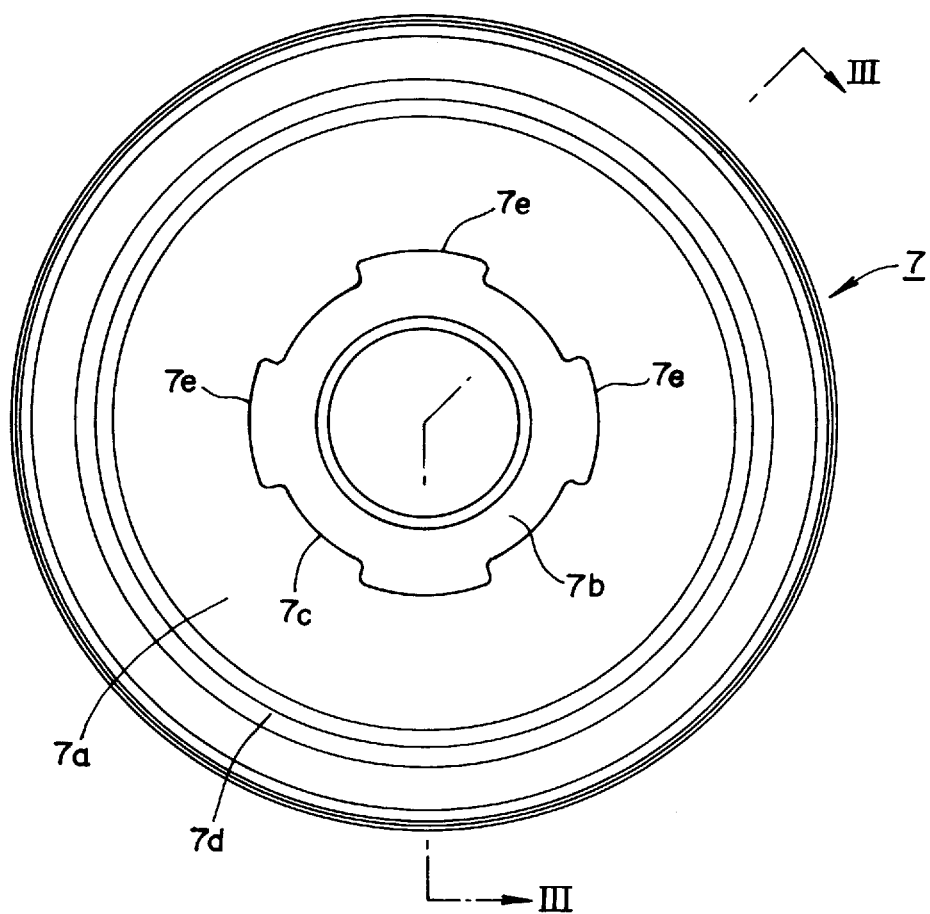
FIG. 2 is a right-hand side elevation of part shown in FIG. 1.
Figure 3:
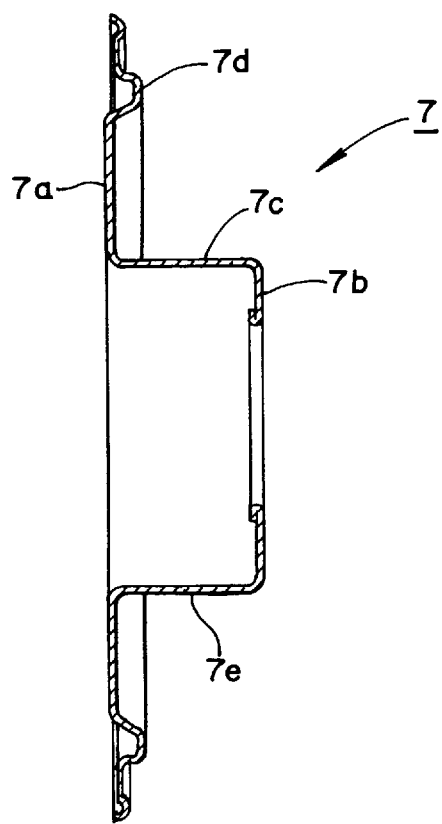
FIG. 3 is a cross section taken along the line III—III shown in FIG. 2.

Referring to FIGS. 2 and 3, the first support member 7 comprises a flange 7a extending radially outward and which substantially defines a front end, a radial portion 7b extending radially inward and which substantially defines a rear end, and a tubular axial portion 7c which joins the flange 7a and the radial portion 7b together. At four locations which are spaced apart at an equal interval circumferentially, the axial portion 7c is formed with portions of an increased diameter 7e which project radially outward. With this construction, it will be seen that an axially extending space is formed at a location inward of each portion 7e which is located radially outward of the inner peripheral surface of the axial portion 7c. At a location adjacent to the outer periphery, the flange 7a is formed with an annular projection 7d which bulges rearwardly. The inner peripheral edge of the radial portion 7b is folded back upon itself outwardly to increase the rigidity.

The inner peripheral edge of the first support member 7 or the inner peripheral edge of the radial portion 7b holds the front end 6b of the bellows 6 which has an increased wall thickness from the rear side in a hermetically sealed manner and the tubular portion 2a of the bulge 2D of the shell 2 is disposed as a press fit into the axial portion 7c of the first support member 7 while simultaneously holding the front end 6b of the bellows 6 in abutment against the end face 2b of the bulge 2D of the shell 2 from the rear side when the support member 7 is holding the front end 6b from the rear side.

An arrangement is also made such that an annular seal member 34 carried by the outer periphery of the first support member 7 or the outer periphery of the flange 7a abuts against the wall surface 2A of the shell 2 at a location radially outward of the inlet 2B. The seal member 34 maintains a hermetic seal between the wall surface 2A of the shell 2 and the outer periphery of the first support member 7 or the outer periphery of the flange 7a.

It will be seen that under this condition, an axial clearance is formed between each portion 7e of the first support member 7 and the tubular portion 2a of the shell 2 while a radial clearance is maintained between the flange 7a of the first support member 7 and the opposing wall surface 2A of the shell 2, as shown in FIG. 1.

In the present embodiment, the front end 6b of the bellows 6 is formed with a number of projections 6c which are spaced apart at an equal interval circumferentially and which project forwardly, the projections 6c abutting against the end face of the bulge 2D. In this manner, a radially extending clearance is formed between adjacent projections 6c.

In the present embodiment, the clearance between the wall surface 2A of the shell 2 and the first support member 7, and the radial clearance formed at the front end 6b of the bellows 6 constitute together a communication channel 8. In this manner, the communication channel 8 establishes a communication between the inlet 2B and the bellows chamber C.

Under this condition, the seal member 34 which is carried by the outer periphery of the first support member 7 is in tight engagement with the wall surface 2A of the shell 2, thereby maintaining a hermetic seal between the outer periphery of the first support member 7 and the wall surface 2A of the shell 2.

Additionally, in the present embodiment, a return spring 33 is disposed in surrounding relationship with the bellows 6, with a front end of the return spring abutting against the first support member 7 at a location radially inward of the annual projection 7d. In this manner, the seal member 34 mounted on the outer periphery of the first support member 7 is strongly urged against the wall surface 2A of the shell 2, thus reliably maintaining a hermetic seal between the wall surface 2A of the shell 2 and the first support member 7.

A connection structure for the rear end 6a of the bellows 6 will now be described. It should be initially mentioned that in the present embodiment, the front inner periphery of the valve body 3 is provided with a plurality of annular steps which are disposed forwardly of the annular projection 3a and which have a sequentially increasing diameter in the forward direction.

A rear end of the retainer 31 for the output shaft 28 is disposed in abutment against a stepped end face 3b of the valve body, from the front side, which forms part of the constant pressure passage 18 at a location adjacent to and radially outward of the end of the output shaft 28 in which the recess is formed.

Figure 4:
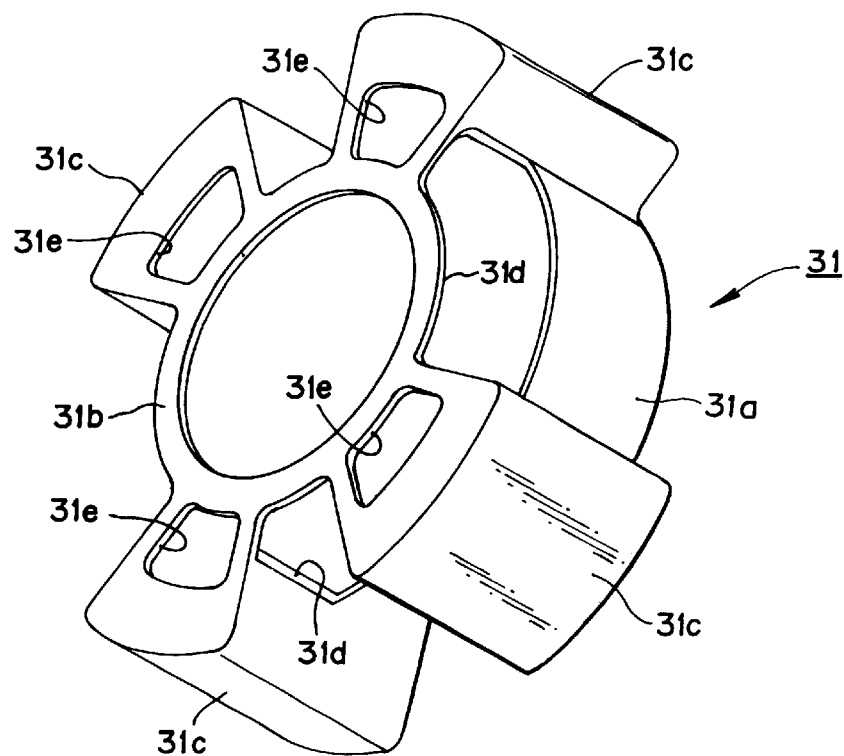
FIG. 4 is a perspective view of part shown in FIG. 1.
Figure 5:
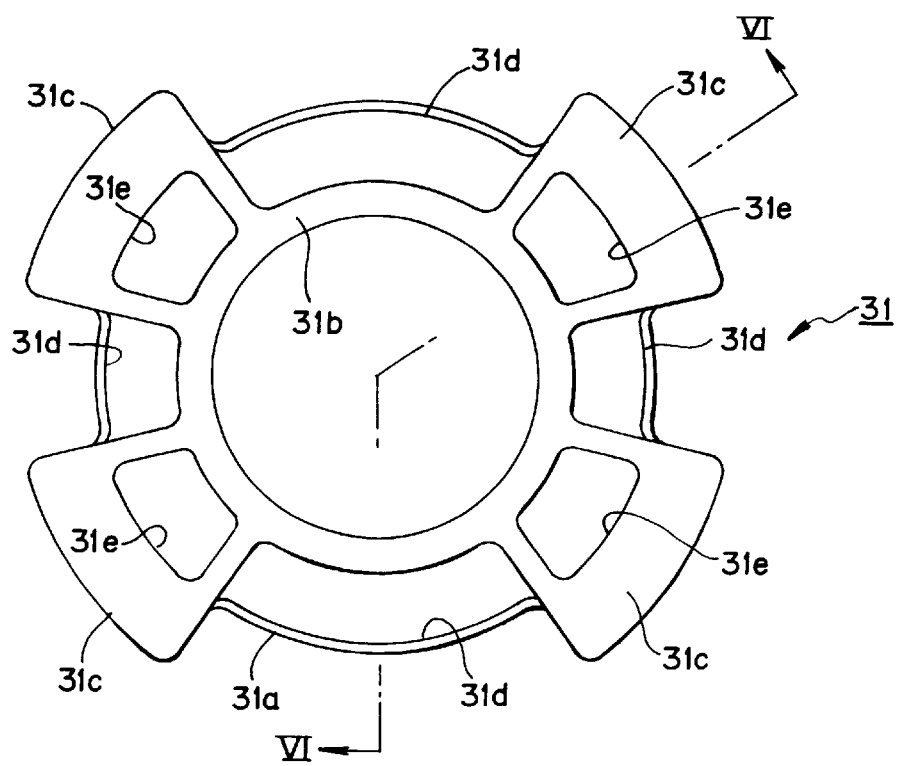
FIG. 5 is a left-hand side elevation of part shown in FIG. 1.
Figure 6:
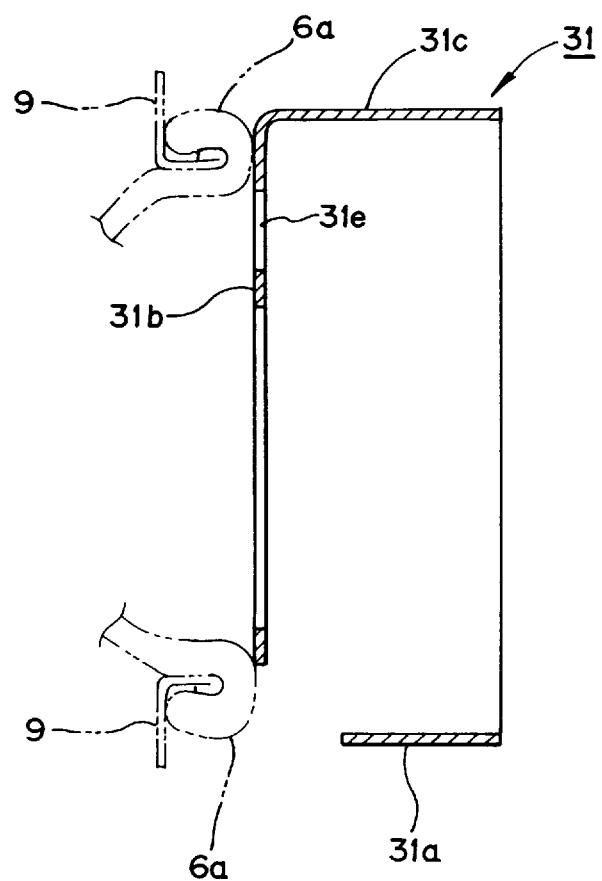
FIG. 6 is a cross section taken along the line VI—VI shown in FIG. 5.

As shown to an enlarged scale in FIGS. 4 to 6, the retainer 31 of the present embodiment comprises an axial portion 31a which extends axially, and a radial portion 31b which extends radially inward from a front end of the axial portion 31a. At four locations which are spaced apart circumferentially, the axial portion 31a is formed with enlarged portions 31c which project radially outward. A notch 31d is formed in a front portion of the axial portion 31a at a location intermediate adjacent enlarged portions 31c.

In its axial portion, the radial portion 31b is formed with a through-opening through which the output shaft 28 extends. A through-aperture 31e having a trapezoidal configuration is formed in the radial portion 31b at each location adjacent to one of the enlarged portions 31c.

The retainer 31 constructed in the manner mentioned above is fitted over the outer periphery of the output shaft 28 from the front side, and the axial portion 31a of the retainer 31 is disposed around the end of the output shaft 28 in which the recess is formed. Under this condition, the rear end of the axial portion 31a of the retainer 31 is brought into abutment against the stepped end face 3b of the valve body 3. At this time, the enlarged portions 31c of the retainer 31 are fitted into the inner periphery of the valve body 3 in a region which is located forward of the stepped end face 3b. When the retainer 31 is mounted on the valve body 3 in the manner mentioned above, an internal space defined within the enlarged portions 31c of the retainer 31 constitutes part of the constant pressure passage 18.

It will be noted that the rear end 6a of the bellows 6 has an increased wall thickness, and is held in place, from the front side, by the inner periphery of an annular, second support member 9. The rear end 6a of the bellows 6 which is held by the second support member 9 in the manner mentioned above is fitted into the inner periphery of the valve body 3 in which the enlarged portions 31c of the retainer 31 are fitted, while simultaneously disposing the rear end 6a in abutment against the radial portion 31b at a location radially outward of the through-aperture 31e. In this manner, a hermetic seal is maintained between the inner periphery of the valve body 3 and the rear end 6a of the bellows 6. This also establishes a communication between the bellows chamber C and the vacuum valve 16 through the constant pressure passage 18.

Around its outer periphery, the second support member 9 is formed with an annular groove 9a which bulges rearwardly. Another annular groove 9b is formed at a location adjacent to, and radially inward of, the annular groove 9a so as to bulge forwardly. The front end or edge of the valve body 3 is engaged by the inner annular groove 9b from the front side while the rear end of the return spring 33 is held in abutment against the annular groove 9a formed in the second support member 9. In this manner, the second support member 9 is maintained in engagement with the valve body 3, preventing the disengagement of the rear end 6a of the bellows 6 from the inner periphery of the valve body 3.

Operation

In the described arrangement, under the inoperative condition shown, the bellows chamber C and the constant pressure chamber A which is located outside thereof communicate with each other through the conduit 21, the inlet 2B and the communication channel 8, and accordingly, a negative pressure is introduced into these chambers. As is well known, in the inoperative condition of the brake booster 1, the vacuum valve 16 is open while the atmosphere valve 16 is closed, and hence a negative pressure is also introduced into the variable pressure chamber B.

Accordingly, when a brake pedal, not shown, is depressed under the inoperative condition to drive the input shaft 26 forward, the atmosphere valve 17 is opened while the vacuum valve 16 of the brake booster 1 is closed, producing a pressure differential between the constant pressure chamber A inclusive of the bellows chamber C and the variable pressure chamber B to operate the brake booster 1 in a manner well known in the art, thus producing a braking liquid pressure in accordance with the magnitude of a force with which the brake pedal is depressed.

When it is desired to operate the brake booster 1 as an automatic brake, a controller, not shown, is used to operate the solenoid operated switching valve 22 under the inoperated condition shown. Thereupon, a communication between the bellows chamber C and the constant pressure chamber A which is located outside thereof is interrupted, while the atmosphere is introduced into the bellows chamber C. The atmosphere in the bellows chamber C is introduced into the variable pressure chamber B through the constant pressure passage 18 and the variable pressure passage 23, thereby allowing the brake booster 1 to function as an automatic brake without depressing a brake pedal.

As described, in the present embodiment, the front end 6b of the bellows 6 is held in abutment against the end face 2b of the bulge 2D of the shell by the first support member 7 to define the communication channel 8 mentioned above. The rear end 6a of the bellows 6 is connected to the inner periphery of the valve body 3 by using a connection structure mentioned above.

In other words, in the present embodiment, the front end 6b of the bellows 6 can be positioned at the location of the end face 2b of the bulge 2D which assumes a position radially inward of the inlet 2B. Accordingly, the external diameter of the bellows 6 can be reduced in comparison to the prior art arrangement in which the front end 6b of the bellows 6 is located at a position radially outward of the inlet 2B. In addition, since the rear end 6a of the bellows 6 is formed as the connection structure mentioned above, the constant pressure passage 18 cannot be closed by the rear end 6a of the bellows 6 which now has a reduced diameter.

In this manner, the present invention allows bellows 6 of a reduced diameter to be used. Accordingly, when the brake booster 1 is operated, a resistance presented by the bellows 6 with respect to a forward movement of the valve body 3 can be reduced, thus reducing a lossy load when operating the brake booster 1.

As mentioned above, the rear end of the bellows 6 is fitted into the inner periphery of the valve body 3 while it is wrapped by the inner periphery of the second support member 9, and hence no damage can be caused to the valve body 3.

It will also be noted that in the present embodiment, the communication channel 8 is formed between the wall surface 2A of the shell 2 and the first support member 8 in the manner mentioned above. Thus, the communication channel 8 is defined within the shell 2 and thus there is no need to provide a spacer for the provision of a communication channel outside the shell 2 as has been employed in the prior art. In this respect, the overall length of the brake booster 1 can be reduced as compared with the prior art.

Second embodiment

Figure 7:
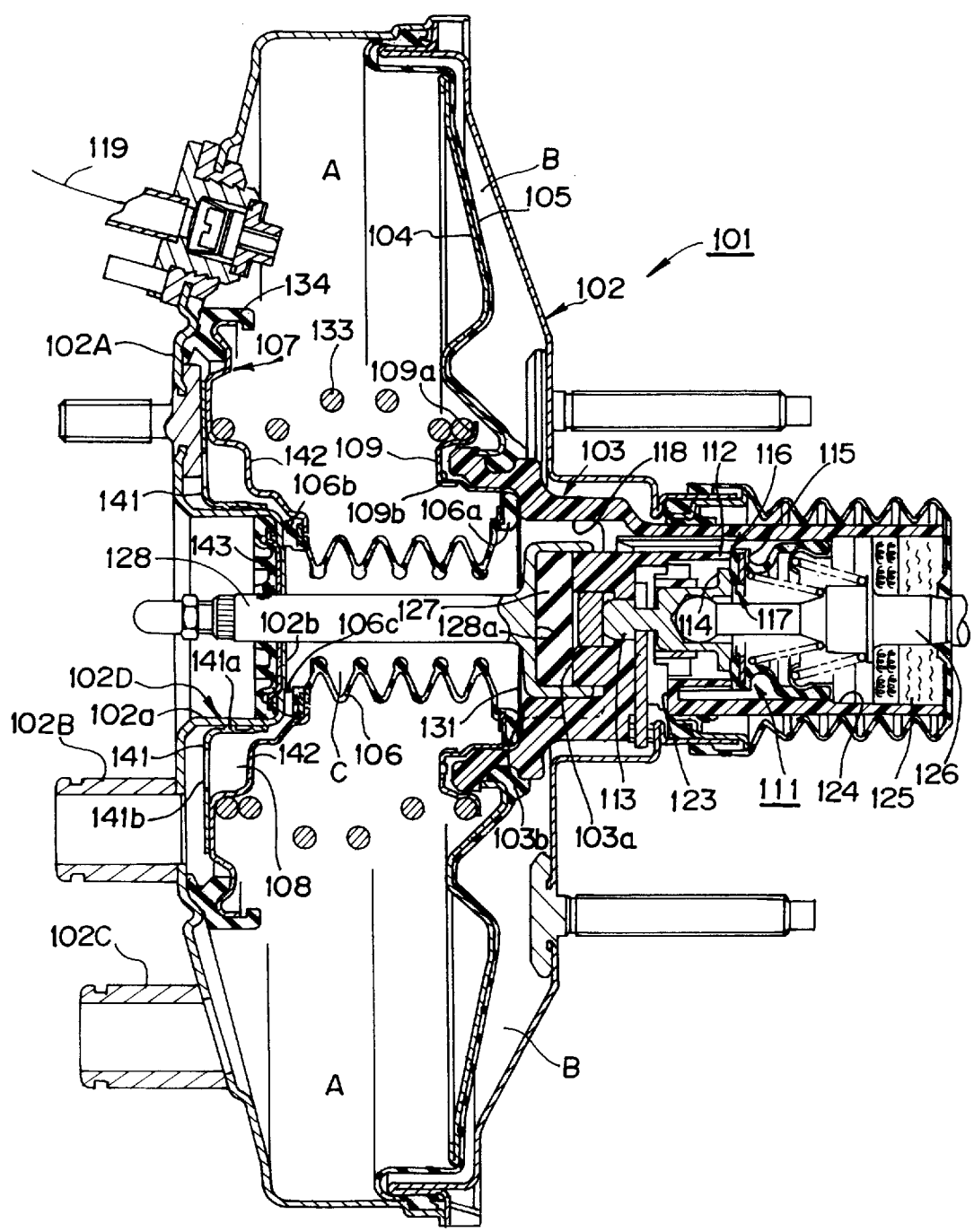
FIG. 7 is a cross section of another embodiment of the invention.

FIG. 7 shows a second embodiment of the invention. In the second embodiment, the construction of a first support member 107 is changed as is a connection structure for a rear end 106a of bellows 106.

Specifically, in the second embodiment, the first support member 107 comprises a front member 141 substantially in the configuration of a flange, and a rear member 142 substantially in the configuration of a cone which is integrally connected to the front member 141.

Around its inner periphery, the front member 141 is formed with a plurality of engaging pawls 141a at locations which are spaced apart at an equal interval cicumferentially. A radial portion of the front member 141 is formed with a plurality of through-apertures 141b. On the other hand, a radial portion of the rear member 142 which substantially defines a front end thereof is joined to the radial portion of the front member 141 at a location radially outward of the plurality of through-apertures 141b, thus integrally connecting the both members 141, 142 together.

The outer periphery of the rear member 142 carries a seal member 134, and the edge extending around the inner periphery of the rear member 142 holds a front end 106b of the bellows 106. Under this condition, the front member 141 is fitted over a tubular portion 102a which is locked in position by the engaging pawls 141a. At the same time, the seal member 134 is held in abutment against the wall surface of a shell 102, and also in abutment against an end face 102b of a bulge 102D of the shell 102.

In the second embodiment, a space formed between a wall surface 102A of the shell 102 and the first support member 107, the through-apertures 141b formed in the front member 141 of the first support member 107, a space defined between the both members 141, 142, a space formed between the bulge 102D and the rear member 142 of the first support member 107 and a radial clearance formed by the front end 106b of the bellows 106 constitute together a communication channel 108.

It will be noted that in the first embodiment described previously, the piston 32a of the master cylinder 32 extends through the bulge 2D, with the front end of the output shaft 28 inserted into a recess in the piston 32a. However, in the second embodiment, an output shaft 128 itself extends through the bulge 102D to project externally of the shell 102. Concomitantly, a conventional seal member 143 is mounted on the bulge 102D, thus maintaining a hermetic seal between the output shaft 128 and the bulge 102D.

A valve body 103 used in the second embodiment has a simplified construction, reducing the number of steps formed around the inner periphery at its front end, as compared with the first embodiment. A plate-shaped retainer 131, which is known in the art, is fitted over the output shaft 128 from the front side, and is then held in abutment against a stepped end face 103b of the valve body 103 around its inner periphery at a location adjacent to, but located radially outward of a constant pressure passage 118. The retainer 131 is formed with a through-aperture at a required location, permitting a communication between the constant pressure passage 118 and bellows chamber C.

The rear end 106a of the bellows 106 is held by the inner periphery of the second support member 109 from the front side, in abutment against the stepped end face 103b around its outer periphery. As in the first embodiment, a return spring 133 is disposed between the outer periphery of a second support member 109 and a first support member 107. In this manner, the seal member 134 is held in abutment against the wall surface of the shell 102 maintaining a hermetic seal in this region. In addition, the rear end 106a of the bellows 106 is strongly held in abutment against the stepped end face 3b, also maintaining a hermetic seal in this region. As a result of simplifying the inner periphery of the valve body 103 at its front portion, the configuration of the second support member 109 is simplified as compared with the first embodiment. In other respects, the arrangement is similar to the first embodiment, and parts corresponding to those shown in the first embodiment are designated by like reference numerals and characters as used before, to which 100 is added.

The second embodiment achieves a similar effect and advantage as brought forth by the first embodiment.

While the invention has be shown and described above in connection with several embodiments thereof, it should be understood that a number of changes, modifications and substitutions therein are possible in light of the above disclosure by one skilled in the art, and therefore, it should be understood that the scope of the invention should be construed from the appended Claims alone.

What is claimed is:

1. A brake booster including a valve body which is disposed in a shell in a movable manner, a power piston mounted on the valve body, a constant and a variable pressure chamber defined across the power piston, bellows disposed within the constant pressure chamber and having its rear end connected to the valve body, a bulge formed in an axial portion of the shell in its front region and extending rearward of the shell, and an inlet formed in the shell at a location radially outward of the bulge for allowing a negative pressure or an atmosphere to be introduced into the internal space of the bellows, the bulge of the shell including a tubular portion which extends rearward, and an end face which extends radially inward from the rear end of the tubular portion;

characterized in that an annular, first support member is disposed within the constant pressure chamber, with a seal member disposed between a portion of the first support member adjacent to the outer periphery thereof and a wall surface of the shell at a location radially outward of the inlet to maintain a hermetic seal in a corresponding region, a front end of the bellows being held by a portion of the first support member adjacent to its inner periphery in a hermetically sealed manner while the front end of the bellows is held in abutment against the end face of the bulge, a space formed between the first support member and an opposing wall surface of the shell and the bulge, and a radial clearance formed at the front end of the bellows constituting together a communication channel which establishes a communication between the inlet and the internal space of the bellows.

2. A brake booster according to claim 1, further including an output shaft disposed inside the bellows, the output shaft being formed with a recess at its rear end, which is slidably fitted over an annual projection formed on the valve body, an annular retainer being fitted around said end of the output shaft to prevent the disengagement of the output shaft from the annual projection of the valve body, an annular, second support member being disposed within the constant pressure chamber and having an inner periphery which holds a rear end of the bellows, the rear end of the bellows being fitted into the inner periphery of the valve body and being held in abutment against the retainer from the front side, further including a return spring disposed within the constant pressure chamber and operable to position the valve body at its inoperative position, the front end of the return spring abutting against the first support member from the rear side while the rear end of the return spring is held in abutment against a portion of the second support member around its inner periphery from the front side.

3. A brake booster according to claim 2 in which the retainer comprises a radial portion against which the rear end of the bellows is held in abutment, a cylindrical axial portion which extends axially from the radial portion, and a clearance portion formed in the axial portion to provide a communication across the retainer.

4. A brake booster according to claim 1 in which an annular, second support member is disposed within the constant pressure chamber and including an inner periphery which holds a rear end of the bellows in abutment against a stepped end face formed around the inner periphery of the valve body, from the front side, further including a return spring disposed within the constant pressure chamber for positioning the valve body at its inoperative position, the return spring having a front end which abuts against the first support member from the rear side and a rear end which abuts against a portion of the second support member around the outer periphery thereof from the front side.

5. A brake booster according to claim 4 in which the first support member comprises a front member including a radial portion in the form of a flange, and a substantially conical rear member which is integrally connected to the radial portion of the front member from the rear side, the radial portion of the front member being formed with a through-aperture which allows a communication thereacross, the front member being formed with a plurality of engaging pawls around its inner periphery, which engage and lock the tubular portion of the bulge, thereby connecting the first support member to the bulge, the seal member being carried by the outer periphery of the rear member to abut against the wall surface of the shell, the front end of the bellows beings carried by the inner periphery of the rear member and held in abutment against the end face of the bulge.

* * * * *